United States Patent
Hiroi et al.

(10) Patent No.: US 9,052,794 B2
(45) Date of Patent: Jun. 9, 2015

(54) DEVICE FOR DISPLAYING MOVEMENT BASED ON USER INPUT AND RENDERING IMAGES ACCORDINGLY

(75) Inventors: Jun Hiroi, Tokyo (JP); Hirotoshi Maegawa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 465 days.

(21) Appl. No.: 13/256,945

(22) PCT Filed: Jan. 18, 2010

(86) PCT No.: PCT/JP2010/000229
§ 371 (c)(1),
(2), (4) Date: Nov. 2, 2011

(87) PCT Pub. No.: WO2010/116578
PCT Pub. Date: Oct. 14, 2010

(65) Prior Publication Data
US 2012/0038677 A1    Feb. 16, 2012

(30) Foreign Application Priority Data
Apr. 9, 2009   (JP) ................. 2009-095050

(51) Int. Cl.
| | | |
|---|---|---|
| G06K 9/36 | (2006.01) | |
| G06F 3/0481 | (2013.01) | |
| G09G 5/34 | (2006.01) | |

(52) U.S. Cl.
CPC ............... *G06F 3/0481* (2013.01); *G09G 5/34* (2013.01)

(58) Field of Classification Search
CPC ................. G06F 3/0481; G09G 5/34
USPC ......... 715/200, 273, 800, 234, 248, 522, 838; 345/665, 667
See application file for complete search history.

(56) References Cited

U.S. PATENT DOCUMENTS

| | | | |
|---|---|---|---|
| 6,563,999 B1 | 5/2003 | Suzuoki | |
| 7,412,326 B2 * | 8/2008 | Yoshioka et al. | ............. 701/459 |

(Continued)

FOREIGN PATENT DOCUMENTS

| | | |
|---|---|---|
| JP | 7175624 A | 7/1995 |
| JP | 2007034631 A | 8/2007 |
| WO | 2007076226 A1 | 7/2007 |

OTHER PUBLICATIONS

International Search Report for corresponding application PCT/JP2010/000229, Apr. 27, 2010.

(Continued)

*Primary Examiner* — Scott Baderman
*Assistant Examiner* — Hassan Mrabi
(74) *Attorney, Agent, or Firm* — Matthew B. Dernier, Esq.; Gibson & Dernier LLP

(57) ABSTRACT

A range having a predetermined width close to a display margin is defined in an image as a restriction area. When the display area enters the restriction area, the moving speed determination unit reduces the speed of moving the display area in accordance with the extent that the display area enters the restriction area. When the request for moving the display area is suspended while the display area enters the restriction area, the bouncing speed determination unit determines the moving speed so that the display area is bounced in a direction away from the restriction area at a speed determined by the extent that the display area enters the restriction area. A frame coordinate computation unit computes frame coordinates of a display area that should be newly displayed, based on the moving speed determined by the moving speed determination unit and the bouncing speed determination unit.

19 Claims, 9 Drawing Sheets

(56) References Cited

U.S. PATENT DOCUMENTS

| | | |
|---|---|---|
| 7,958,456 B2* | 6/2011 | Ording et al. ............ 715/784 |
| 2006/0133586 A1* | 6/2006 | Kasai et al. ............ 379/88.12 |
| 2007/0150830 A1 | 6/2007 | Ording et al. |
| 2007/0290999 A1* | 12/2007 | Cho et al. ............ 345/158 |
| 2008/0159708 A1* | 7/2008 | Kazama et al. ............ 386/69 |
| 2008/0225014 A1* | 9/2008 | Kim ............ 345/173 |
| 2009/0015600 A1* | 1/2009 | Ouchi ............ 345/684 |
| 2009/0241059 A1* | 9/2009 | Moore et al. ............ 715/800 |
| 2011/0022985 A1 | 1/2011 | Ording et al. |

OTHER PUBLICATIONS

International Preliminary Report on Patentability and Written Opinion for corresponding application PCT/JP2010/000229, Nov. 15, 2011.

Office Action issued for corresponding Japanese Patent Application No. 2009-095050, dated Aug. 6, 2013.

* cited by examiner

DEVICE FOR DISPLAYING MOVEMENT BASED ON USER INPUT AND RENDERING IMAGES ACCORDINGLY

TECHNICAL FIELD

The present invention relates to information processing technology adapted to display images in accordance with user control of a display area.

BACKGROUND ART

Home entertainment systems capable of playing back moving images as well as running game programs have been proposed. In home entertainment systems, a GPU generates three-dimensional images using polygons (see, for example, patent document No. 1).

Portable terminals available nowadays are provided with a display screen of an increasingly larger size and are capable of displaying high-definition images regardless of the type of an information processing device. The higher the definition of an image, or, the more information sought to be displayed in a single image, the larger the size of an image displayed. As a result, users are seen in daily scenes to move an area displayed on a screen regardless of the content displayed.

[patent document No. 1] U.S. Pat. No. 6,563,999

In a content in which a partial area of an image with a large size is displayed on a screen, the user may be lost as to where in the original image the currently displayed area is located. This may produce inefficiency in that the user may advance the display area, unaware of the fact that the display area has already reached an edge of the image or wander in a blank area that lacks information to be displayed, stressing the user as a result.

SUMMARY OF THE INVENTION

The present invention addresses the issue and a purpose thereof is to provide a technology capable of moving a display area efficiently and smoothly.

One embodiment of the present invention relates to an information processing device. The information processing device comprises: an input information acquisition unit configured to receive a request for changing a display area displayed on a display device within a target image to be displayed, by at least moving on the target image plane, enlarging, or reducing the display area, the request being received via an input device controlled by a user; and a displayed image processing unit configured to change the display area and render the image accordingly, in accordance with the request for changing the display area, wherein the displayed image processing unit changes the display area at a speed smaller than the speed of change included in the request when the display area enters a predefined specified area on the target image plane or a predefined magnification scale range and while the request for changing the display area remains in effect.

Another embodiment of the present invention relates to an information processing method. The information processing method comprises: receiving a request for changing a display area displayed on a display device within a target image to be displayed, by at least moving on the target image plane, enlarging, or reducing the display area, the request being received via an input device controlled by a user; and changing the display area at a speed smaller than the speed of change included in the request when the display area enters a predefined specified area on the target image plane or a predefined magnification scale range and while the request for changing the display area remains in effect, and displaying the display area on the display device accordingly.

Still another embodiment of the present invention relates to a data structure for image display. The data structure for image display is configured to map data for an image to a configuration file configured to define at least one of a predefined specified area on an image plane and a magnification scales range where a display area displayed on a display device within the image is changed, while a request for changing the display area by at least moving on the image plane, enlarging, or reducing the display area is being issued by a user, at the speed smaller than a speed of change included in the request.

Optional combinations of the aforementioned constituting elements, and implementations of the invention in the form of methods, apparatuses, systems, computer programs, and recording mediums having embodied thereon a computer program may also be practiced as additional modes of the present invention.

According to the present invention, a display area can be moved smoothly and efficiently.

DETAILED DESCRIPTION OF THE INVENTION

Figure 1:
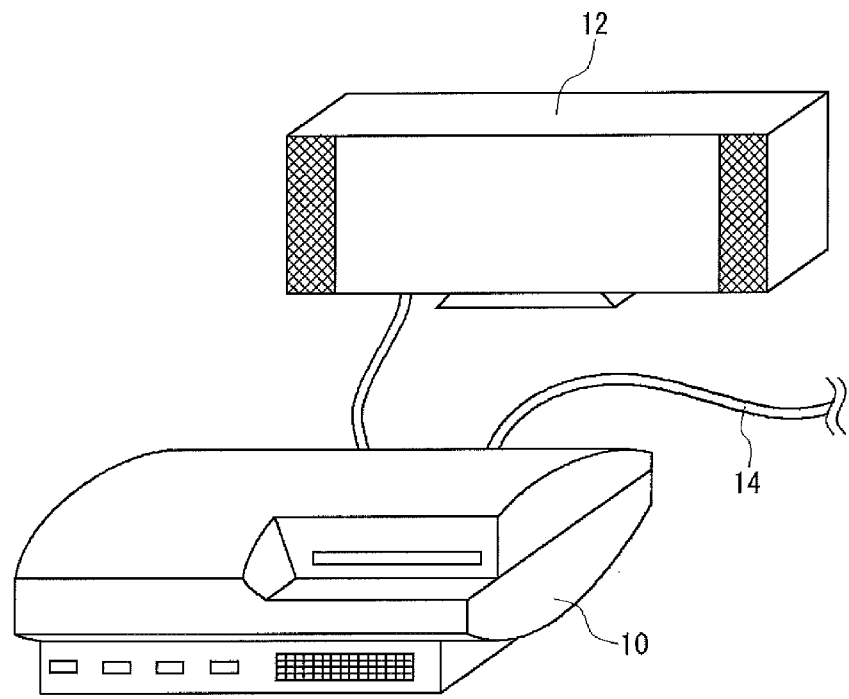
FIG. 1 shows an environment in which an image processing system according to an embodiment of the present invention is used.

FIG. 1 shows an environment in which an information processing system 1 according to an embodiment of the present invention is used. The information processing system 1 comprises an information processing device 10 configured to process a content including a function for at least one of image processing, movie playback, audio playback, communication, etc. The system 1 also comprises a display device 12 configured to output a result of processing by the information processing device 10. The display device 12 may be a television set provided with a display for outputting an image and a speaker for outputting sound. The display device 12 may be connected to the information processing device 10 by cable or connected wirelessly using, for example, wireless LAN (Local Area Network).

The information processing device 10 in the information processing system 1 may be connected to an external network such as the Internet by a cable 14 and download and acquire, for example, content software including image data. The information processing device 10 may be connected to an external network wirelessly. The information processing device 10 may be a game device or a personal computer and may execute contents by loading software from a recording medium. The content may be non-limiting so long as the content includes an image for display.

The user viewing the image displayed on the display device 12 uses an input device to provide an input requesting enlargement/reduction of a display area, or requesting upward, downward, leftward, or rightward scrolling. In response, the input device transmits a request signal requesting enlargement/reduction of a display area, or requesting upward, downward, leftward, or rightward scrolling to the information processing device 10. The information processing device 10 changes the image in the screen of the display device 12 in accordance with the signal. Hereinafter, the movement of an image in the screen, including enlargement or reduction, will be referred to as "movement of a display area".

Figure 2:
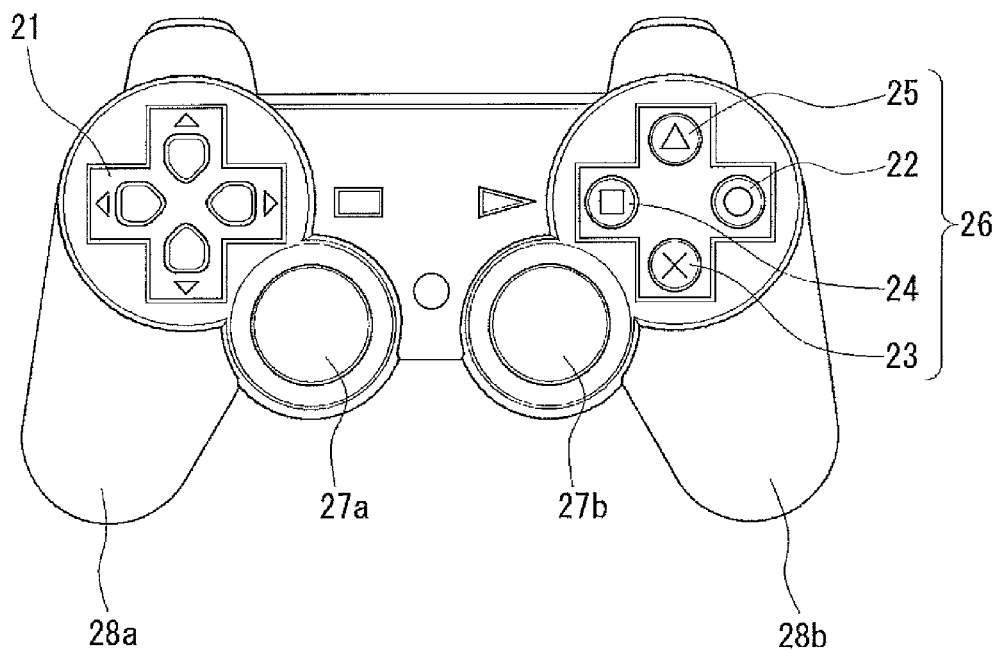
FIG. 2 shows the appearance of an input device that can be applied to the image processing system of FIG. 1.

FIG. 2 shows the appearance of the input device 20. The input device 20 is provided with directional keys 21, analog sticks 27a, 27b, and four control buttons 26, which are means for user control, and handles 28a and 28b. The four buttons 26 comprises a circle button 22, a cross button 23, a square button 24, and a triangle button 25.

The user control means of the input device 20 in the information processing system 1 is assigned the function of entering a request for enlarging/reducing a display area, and entering a request for scrolling upward, downward, leftward, or rightward as well as entering a request for starting/ending a content, and for running various functions corresponding to the content. For example, the function of entering a request for enlarging/reducing a displayed image may be allocated to the right analog stick 27b. The user can enter a request for reducing a display area by pulling the analog stick 27b toward the user and can enter a request for enlarging a display area by pushing it away from the user. The speed of changing the scale of magnification may be adjusted according to the angle at which the analog stick 27b is tilted.

The function of entering a request for scrolling may be allocated to the analog stick 27a. By tilting the analog stick 27a in a desired direction, the user can enter a request for scrolling in that direction. The speed of scrolling may be adjusted according to the tilt angle. The function of entering a request for moving a display area may be allocated to another control means. For example, the function of entering a request for scrolling may be allocated to the directional keys 21.

The input device 20 has the function of transferring an input request signal to the information processing device 10. In the embodiment, the input device 20 is configured to be capable of communicating with the information processing device 10 wirelessly. The input device 20 and the information processing device 10 may establish wireless communication using the Bluetooth (registered trademark) protocol or the IEEE802.11 protocol. The input device 20 may be connected to the information processing device 10 via a cable so as to transfer a request signal to the information processing device 10 accordingly.

The image displayed according to the embodiment may be any visual information such as a game image, menu image, web page image, map, photo, picture, advertisement, newspaper, magazine, etc. The purpose of displaying the image or the post-display function is non-limiting. Therefore, the structure of image data or format of compression is also non-limiting. A description will be given of a technology of displaying a hierarchical image by way of example.

The technology of displaying a hierarchical image is directed to enlarging/reducing a displayed image or scrolling the image upward, downward, leftward, or rightward, using tile images of a plurality of resolutions generated from a digital image such as a high-definition photo. In this technology, the size of an original image is reduced in a plurality of stages to generate images of different resolutions so as to represent the original image in a hierarchical structure where the image in each layer is divided into one or a plurality of tile images. Normally, the image with the lowest resolution comprises one tile image. The original image with the highest resolution comprises the largest number of tile images. An image processing device is configured to enlarge or reduce a displayed image such that an enlarged view or reduced view is presented efficiently by switching a currently used tile image to a tile image of a different layer.

Figure 3:
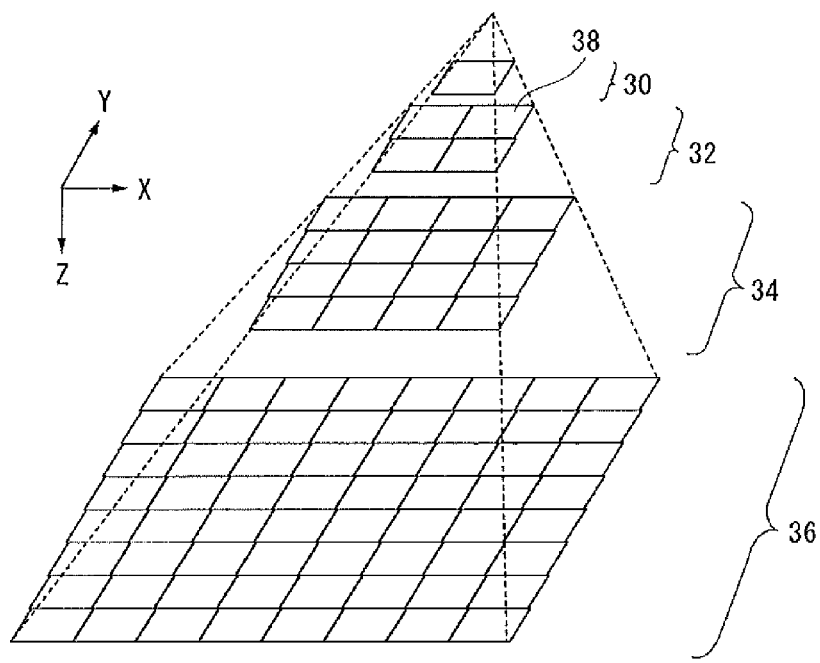
FIG. 3 shows the hierarchical structure of image data used in the embodiment.

FIG. 3 shows the hierarchical structure of image data for a hierarchical image. The image data has a hierarchical structure comprising a 0-th layer 30, a first layer 32, a second layer 34, and a third layer 36 in the direction of depth (Z axis). While the figure only shows four layers, the number of layers is nonrestrictive. Hereinafter, image data having such a hierarchical structure will be referred to as "hierarchical image data".

The hierarchical image data shown in FIG. 3 has a quadtree hierarchical structure. Each layer comprises one or more tile images 38. All of the tile images 38 are formed to have the same size having the same number of pixels. For example, an image includes 256×256 pixels. The image data in the respective layers are representations of an image in different resolutions. The original image in the third layer 36 having the highest resolution is reduced in a plurality of stages to generate the image data for the second layer 34, the first layer 32, and the 0-th layer 30. For example, the resolution in the Nth layer (N is an integer equal to or greater than 0) may be ½ the resolution of the (N+1)th layer in both the horizontal (X axis) direction and the vertical (Y axis) direction.

In the information processing device 10, etc. the hierarchical image data is compressed in a predefined compression format and is stored in a storage device. When a content is started, the data is read from the storage device and decoded. The information processing device 10 according to the embodiment is provided with the decoding function compatible with a plurality of compression formats. For example, the device is capable of decoding compressed data in the S3TC format, JPEG format, JPEG2000 format. Compression may be performed for each tile image in the hierarchical data. Alternatively, a plurality of tile images included in the same layer or a plurality of layers may be compressed at a time.

As shown in FIG. 3, the hierarchical structure of hierarchical data is configured such that the horizontal direction is defined along the X axis, the vertical direction is defined along the Y axis, and the depth direction is defined along the Z axis, thereby building a virtual three-dimensional space. Upon deriving the amount of move of the display area by referring to the signal supplied from the input device 20 to request the movement of a display area, the information processing device 10 uses the amount of move to derive the coordinates at the four corners of a frame (frame coordinates) in the virtual space. Frame coordinates in the virtual space are used to generate a displayed image. Instead of the frame coordinates in the virtual space, the information processing device 10 may derive information identifying the layer and the texture coordinates (UV coordinates) in the layer. Hereinafter, the combination of the information identifying the layer and the texture coordinates will also be referred to as frame coordinates.

The image data in the hierarchies are discretely located along the Z-axis of the virtual space. For this reason, when an image is displayed at a scale of magnification located between layers not containing image data, image data located in the neighborhood in the Z-axis direction is used. For example, if the scale of magnification of a displayed image is in the neighborhood of the second layer 34, the displayed image is created using the image data for the second layer. In order to achieve this, a boundary of switching source images is provided between layers, e.g. in the middle of the layers. When the scale of magnification of a displayed image goes beyond the switching boundary, the image data used to create a displayed image is switched so that the selected image is enlarged or reduced for display.

Figure 4:
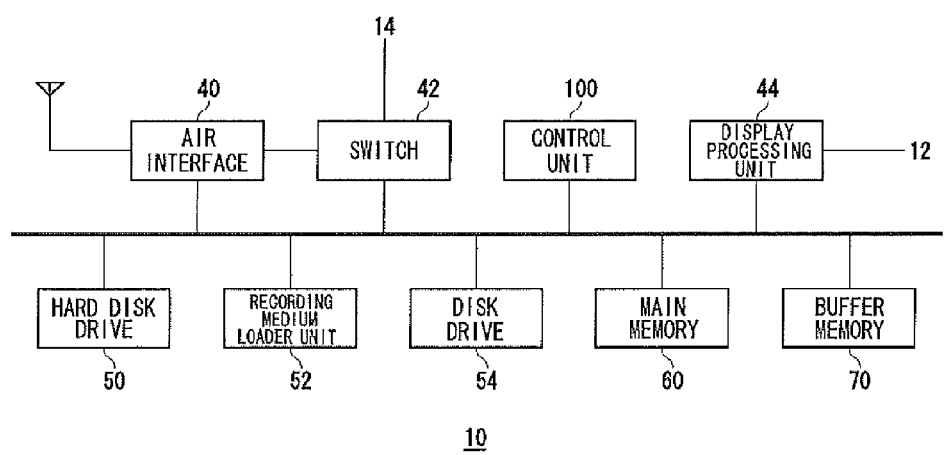
FIG. 4 shows the configuration of the information processing device according to the embodiment.

FIG. 4 shows the configuration of the information processing device 10. The information processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark), a device connected to an external device by cable or wirelessly so as to transmit and receive data. The switch 42 may be connected to an external network via the cable 14 so as to receive a content file including compressed image data. The content file may include various application programs or data depending on the purpose of the content as well as including image data or configuration files described later.

The switch 42 is connected to the air interface 40. The air interface 40 is connected to the input device 20 using a predefined wireless communication protocol. A signal requesting to move a display image as input by the user via the input device 20 is supplied to the control unit 100 via the air interface 40 and the switch 42.

The hard disk drive 50 functions as a storage device for storing data. The compressed image data received via the switch 42 is stored in the hard disk drive 50. When a removable recording medium such as a memory card is mounted, the recording medium loader unit 52 reads data from the removable recording medium. When a ROM disk is mounted, the disk drive 54 drives and recognizes the ROM disk so as to read data. The ROM disk may be an optical disk or a magneto-optical disk. The content file may be stored in the recording medium.

The main controller 100 is provided with a multicore CPU. One general-purpose processor core and a plurality of simple processor cores are provided in a single CPU. The general-purpose processor core is referred to as a power processing unit (PPU) and the other processor cores are referred to as synergistic-processing units (SPU).

The main controller 100 is provided with a memory controller connected to the main memory 60 and the buffer memory 70. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The local memory may be used as the buffer memory 70.

The main memory 60 and the buffer memory 70 are storage devices and are formed as random access memories (RAM).

The SPU is provided with a dedicated direct memory access (DMA) controller as a control unit and is capable of high-speed data transfer between the main memory 60 and the buffer memory 70. High-speed data transfer is also achieved between the frame memory in the display processing unit 44 and the buffer memory 70. The control unit 100 according to the embodiment implements high-speed image processing by operating a plurality of SPUs in parallel. The display processing unit 44 is connected to the display device 12 and outputs a result of image processing in accordance with user request.

The information processing device 10 according to the embodiment may be configured to load at least a part of the compressed image data from the hard disk drive 50 into the main memory 60 in order to update a displayed image smoothly as the display area is moved. Further, the device 10 may be configured to predict an image to be displayed in the future based on the direction of past move of the display area, and decode part of the compressed image data loaded into the main memory 60 and store the decoded data in the buffer memory 70. This allows instant switching of images used for creation of displayed image when the switching is required later.

Figure 5:
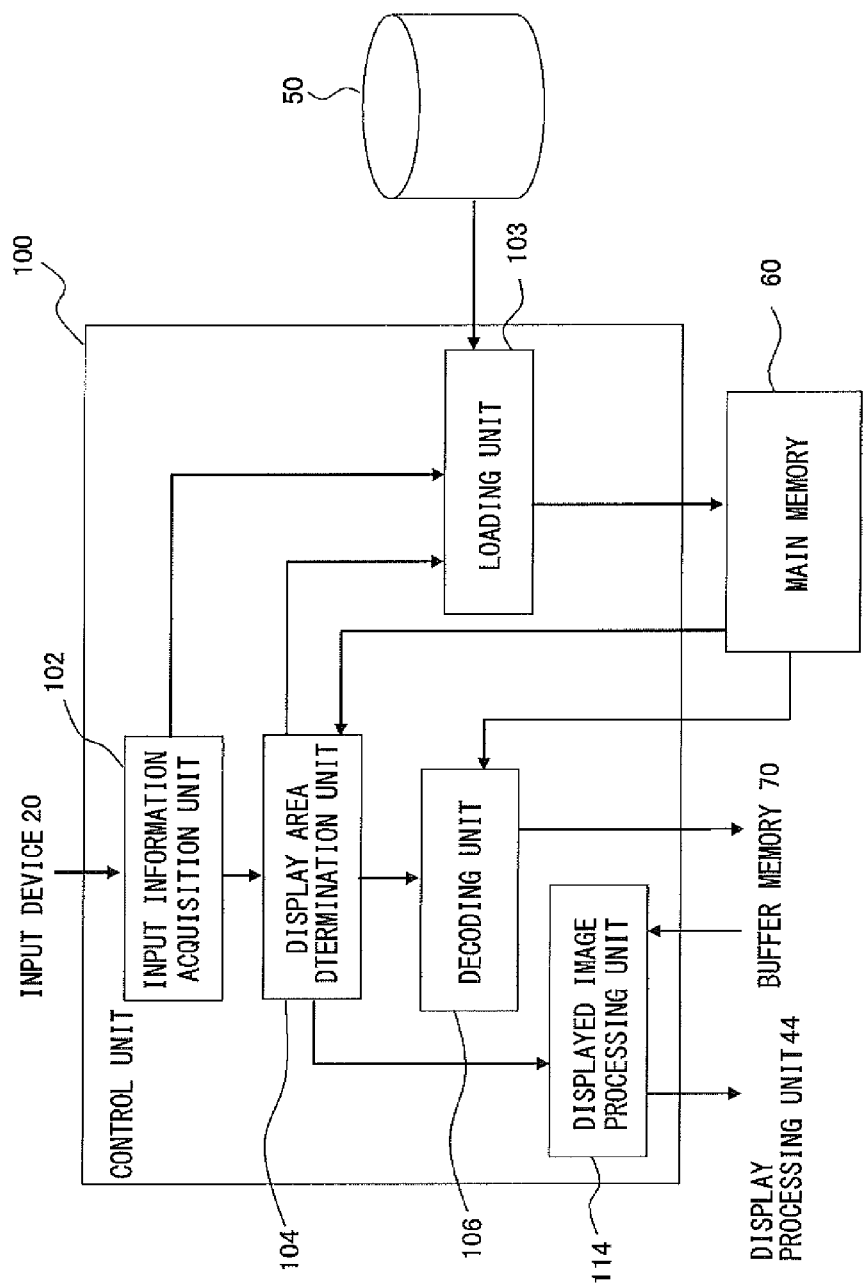
FIG. 5 shows the structure of a control unit according to the embodiment in detail.

FIG. 5 shows the structure of the control unit 100 according to the embodiment in detail. The control unit 100 comprises an input information acquisition unit 102 for acquiring information entered by the user via the input device 20, a load unit 103 for loading image data to be displayed from the hard disk drive 50, a display area determination unit 104 for determining a next display area according to user control, a decoding unit 106 for decoding compressed image data, and a displayed image processing unit 114 for rendering a displayed image.

Figure 6:
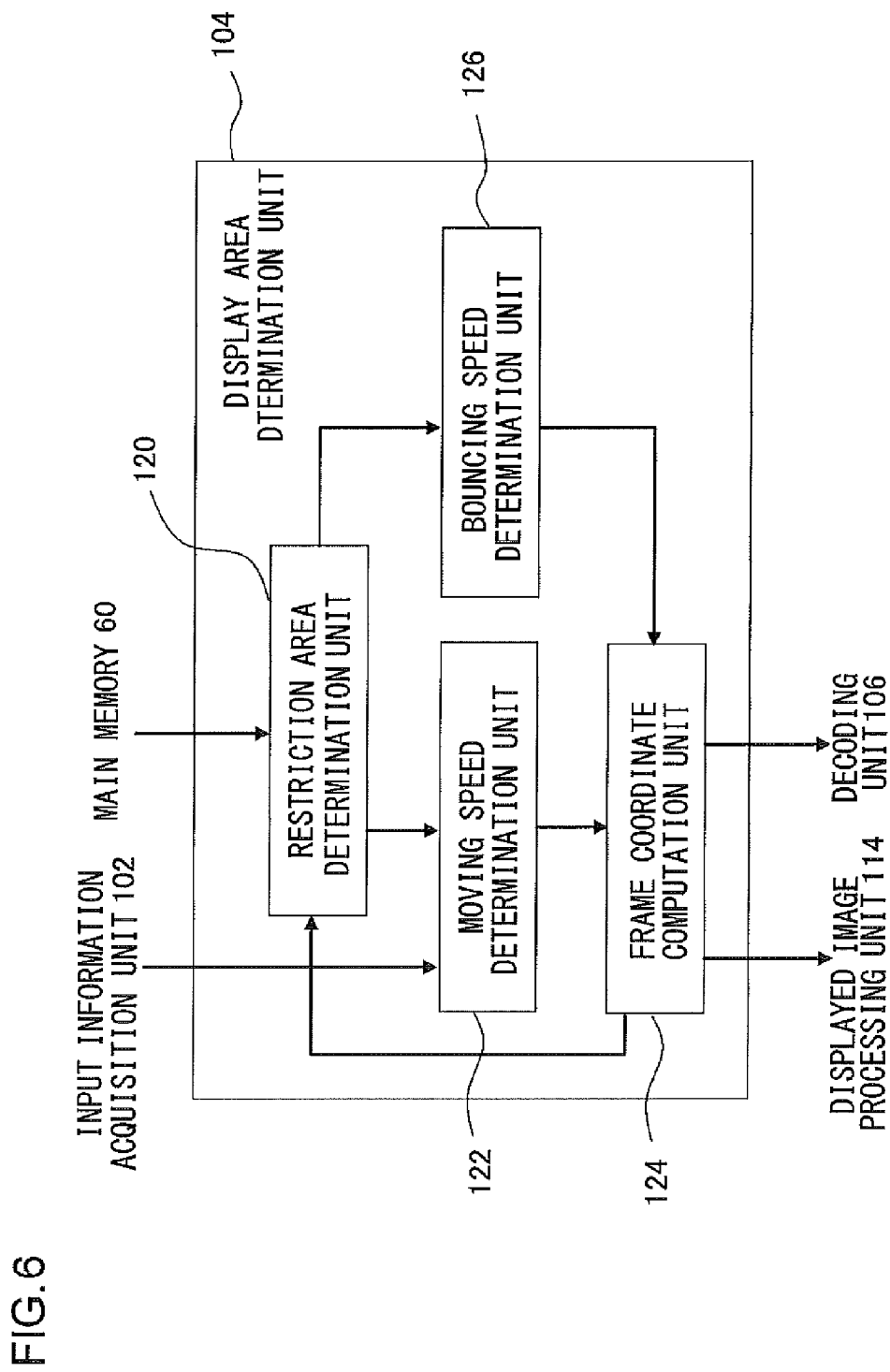
FIG. 6 shows the structure of a display area determination unit according to the embodiment in detail.

The elements depicted in FIGS. 5 and 6. as functional blocks for performing various processes are implemented in hardware such as a central processing unit (CPU), memory, or other LSI's, and in software such as a programs etc., loaded into the memory. As describe above, the control unit 100 includes one PPU and a plurality of SPUs. The PPU and the SPUs form the functional blocks alone or in combination. Therefore, it will be obvious to those skilled in the art that the functional blocks may be implemented in a variety of manners by hardware only, software only, or a combination of thereof. FIG. 5 shows only those functional blocks of the control unit 100 related to the process of updating a display area. Alternatively, other functional blocks may be included depending on the content executed.

The hard disk drive 50 stores a content file including image data and a configuration file. The image data may be hierarchical data or comprise a single hierarchy. In this embodiment an area where the movement of a display area is restricted (hereinafter, restriction area) is provided in an image to be displayed. Information on the restriction area is written in the configuration file.

For example, a restriction area is an area of a predetermined width measured from a display margin beyond which the movement of a display area is no longer possible (e.g., an edge of an image). A restriction area may include a range of enlargement or reduction as well as including an area on the image plane. In other words, a restriction area is defined by coordinates in the three-dimensional virtual space as shown in FIG. 3 irrespective of whether the image data is hierarchical data.

The input information acquisition unit 102 acquires a signal requesting starting/ending of a content, movement of a display area, etc. in accordance with user control of the input device 20. The input information acquisition unit 102 communicates the information to the display area determination unit 104 and the loading unit 103 as necessary. When notified by the input information acquisition unit 102 of a request for starting a content, the loading unit 103 reads necessary data such as image data, a configuration file, and a program from the hard disk drive 50 and stores the data in the main memory 60.

When notified by the input information acquisition unit 102 of a request for moving a display, the display area determination unit 104 determines the speed of movement of the display area based on the content of control performed by the user to request the movement and included in the request signal. The display area determination unit 104 accordingly determines frame coordinates of an area that should be displayed next. For example, the display area determination unit 104 determines the frame coordinates of the next display area, by acquiring the speed of movement of the display area from the angle of tilting the analog stick 27*a* of the input device 20 and determining the amount of move from the previous display area. The term "next display area" refers to a display area displayed when a time interval sufficient for updating has elapsed since the "previous display area" was displayed. The time interval depends on, for example, the vertical synchronization frequency of the display device.

In further accordance with the embodiment, the movement speed is restrained when the display area enters a restriction area. When the request for moving the display area is suspended as a result of, for example, the user releasing the analog stick 27*a*, 27*b* while the display area enters the restriction area, the display area is moved outside the restriction area in a bouncing action. This allows the user to intuitively recognize that the display area moved by the user is about to reach a display margin and makes it easy for the user to remove the display area away from the display margin and return the display area to a desired area. This will prevent the user from feeling that the display area stops moving abruptly in an unexpected manner when the area reaches the display margin and help avoid a difficult situation where the user is lost as to the direction of movement in the neighborhood of the display margin.

A restriction area defined on the image plane need not be an area close to the display margin such as an edge of the image beyond which the display is physically impossible. For example, a restriction area may similarly be defined at an arbitrary position such as a blank area where information is not displayed. Establishment of such a restriction area will also help reduce the trouble of being lost as to which direction to return to or of abrupt suspension of movement of the display area when the display area enters such an area.

The decoding unit 106 reads part of the compressed image data from the main memory 60 and decodes the data. The decoding unit 106 stores the decoded data in the buffer memory 70. The data decoded by the decoded data 106 may be image data of a predetermined size including the display area. By decoding image data of a wide range and storing the decoded data in the buffer memory 70, the frequency of reading from the main memory 60 can be reduced and the display area can be moved smoothly.

The displayed image processing unit 114 acquires the frame coordinates of an area determined by the display area determination unit 104 to be displayed. The displayed image processing unit 114 reads the corresponding image data from the buffer memory 70 and renders the data in the frame memory of the display processing unit 44.

FIG. 6 shows the structure of the display area determination unit 104 in detail. The display area determination unit 104 includes a restriction area determination unit 120 for determining whether a display area enters a restriction area, a moving speed determination unit 122 for determining the speed of moving a display area based on the amount of user control of the input device, a frame coordinate computation unit 124 for computing frame coordinates of a display area that should be displayed next, a bouncing speed determination unit 126 for determining the speed of bouncing a display area from a restriction area.

The restriction area determination unit 120 determines whether a current display area enters a restriction area by reading a configuration file from the main memory 60 and acquiring the frame coordinates of the current display area from the frame coordinate computation unit 124. When the display area does not enter the restriction area, the moving speed determination unit 122 computes the moving speed in accordance with the amount of user control of the input device 20. For example, when the analog stick 27*a* of the input device 20 is used to scroll an image, the angle of tilting the analog stick 27*a* and the speed of moving a display area are mapped to each other linearly or curvilinearly so that the maximum permitted moving speed occurs at the maximum angle of tilting the analog stick 27*a*.

The moving speed determination unit 122 refers to the mapping so as to acquire the speed of moving the display area from the angle of tilting acquired by the input information acquisition unit 102. The same is true of enlargement or reduction using the analog stick 27*b*. Where the directional keys 21 are used instead of the analog sticks 27*a*, 27*b*, the amount of control of the input device 20 acquired by the input information acquisition unit 102 can equally be converted into the moving speed by mapping the duration or frequency of pressing the directional keys 21 to the moving speed. The permitted maximum moving speed may be determined by, for example, the time required to decode image data for a portion of the display area that should be updated as a result of the movement. The moving speed may be constant irrespective of the amount of control of the input device.

When the display area enters a restriction area, the moving speed determination unit 122 reduces the moving speed, which is dependent on the amount of control, in accordance with the extent that the display area enters the restriction area. More specifically, the deeper the display area enters the restriction area, the less the moving speed until it reaches 0 when the display area reaches the display margin. The user may continue to use the same amount of control to move the display area but feel as if the user is pressing the display area toward an invisible elastic wall as the speed of the display area is gradually reduced since the display area entered the restriction area.

The bouncing speed determination unit 126 determines the moving speed occurring when the request for moving the display area is suspended while the display area enters the restriction area. Suspension of the request for moving the display area occurs when, for example, the user releases the analog stick 27*a*, 27*b* or the directional keys 21 manually controlled by the user. The bouncing speed determination unit 126 determines the moving speed so that the display area is moved away from the restriction area at a speed determined by the extent that the display area enters the restriction area when the aforementioned situation occurs. The movement as designed above lets the user feel as if the display area is bounced off as a result of removing the force exerted against the invisible wall.

The frame coordinate computation unit 124 refers to the moving speed determined by the moving speed determination unit 122 and the bouncing speed determination unit 126 so as to determine the amount of move from the current display area and compute the frame coordinates of the display area that should be newly displayed. As described above, information on the frame coordinates is communicated to the decoding unit 106 and the displayed image processing unit 114 so that the image data for the location that should be updated is newly rendered so that the image is displayed accordingly.

Figure 7:
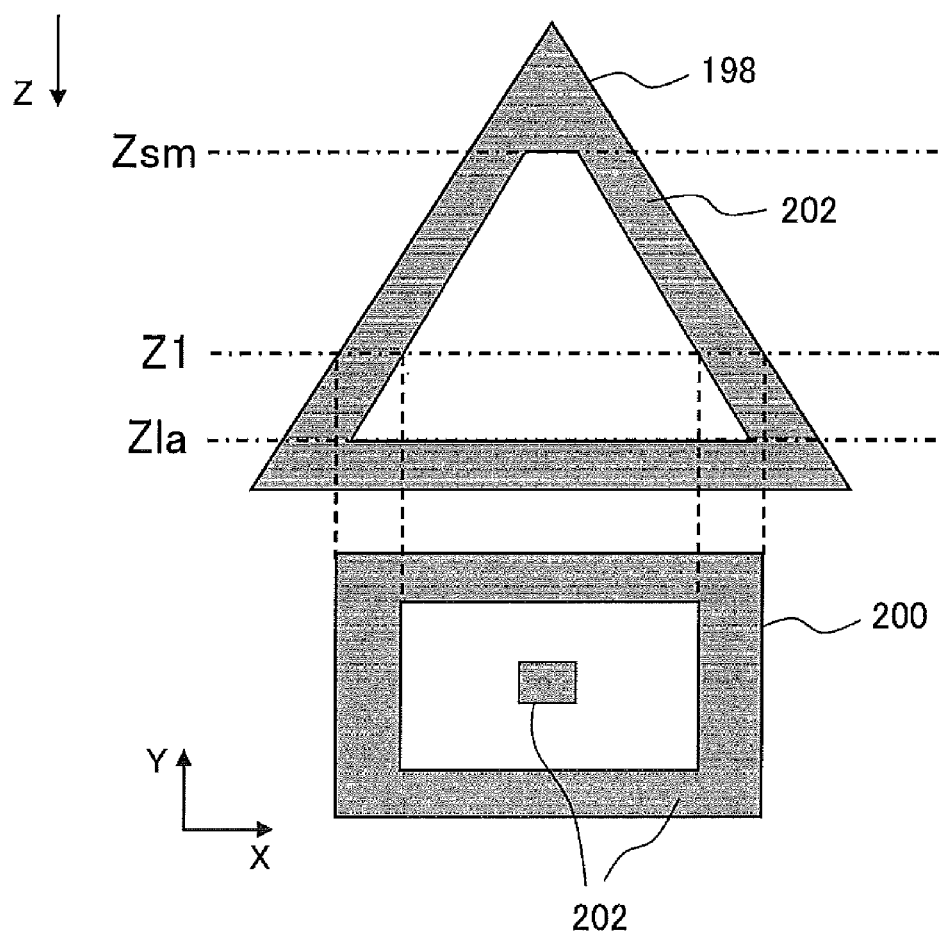
FIG. 7 shows a figure for explaining a restriction area defined according to the embodiment.

FIG. 7 shows a figure for explaining a restriction area defined according to the embodiment. Referring to FIG. 7, the base of a triangle 198 represents an image plane of the image of the maximum magnification scale as viewed from side. Apparent image planes occurring as the magnification scale is reduced in the direction of height are presented in the horizontal direction. In the hierarchical data shown in FIG. 3, the target of decoding is switched to image data of a different layer depending on the variation of magnification scale in the direction of height. This is similar in the case of image data not having a hierarchical structure. Namely, the apparent size of an image varies in a triangular fashion as illustrated depending on the magnification scale (Z-axis).

FIG. 7 shows an image 200 occurring when the magnification scale is Z1. The image 200 is located on an image plane defined by the X-axis and Y-axis as in FIG. 3. A restriction area 202 indicated by hatching is defined in the three-dimensional virtual space comprising the X-axis, Y-axis, and Z-axis. In the illustrated example, the restriction area 202 is provided at the edges and the center of the image. Further, threshold values Zla and Zsm of the magnification scale are defined so that the magnification scale smaller than the smaller threshold value Zsm and the magnification scale larger than the larger threshold value Zla define the restriction area 202.

As described above, the restriction area 202 is desirably defined in an area close to a display margin such as the edge of an image and having a predetermined width, or an area where there is no information, or an area that a content creator would not like to display. The restriction area may be defined for the magnification scale such that the larger threshold value Zla is defined to be smaller than the upper limit of the magnification scale determined by the resolution of the original image or the resolution of the display device by a predetermined value, and such that the smaller threshold value Zsm is defined to be larger than the lower limit of the magnification scale capable of showing the entirety of the original image in a screen by a predetermined value.

FIG. 7 depicts the width of the restriction area 202 at the edges of the image 200 as being constant relative to the magnification scale. Alternatively, the width may be smaller as the magnification scale is reduced so that the same area in the image is used as the restriction area 202. Similarly, the size of the restriction area 202 isolated in the image may vary depending on the magnification scale. When the magnification scale is small and the isolated restriction area 202 is smaller than the display area, restriction of the movement of the display area may be meaningless. To address such a case, a new threshold value may be defined for the magnification scale so that the isolated restriction area 202 is valid as a restriction area when the magnification scale of the display area is equal to or larger than the threshold value and invalid when the magnification scale is smaller than the threshold value. The boundary of the restriction area 202 in the image may be curvilinear.

The data for the restriction area as shown in FIG. 7 may be defined in the configuration file. Alternatively, the restriction area determination unit 120 may analyze the image and create the data for the restriction area, when an application for displaying images is started and the image data is loaded into the main memory 60. For example, the size of the original image, which is indicated as the base in FIG. 7, is acquired so that the width of the restriction area 202 at the edges of an image is determined in accordance with the size. In other words, the area at the edges of the original image is defined as the restriction area 202. Mapping of the size of an image to the width of the restriction area 202 is defined in the configuration file. "The edges of an image" in which the restriction area is defined may be located inside or outside the sides of an image (image frame) or may extend over the sides. The configuration file defines where the edges are located.

Figure 8:
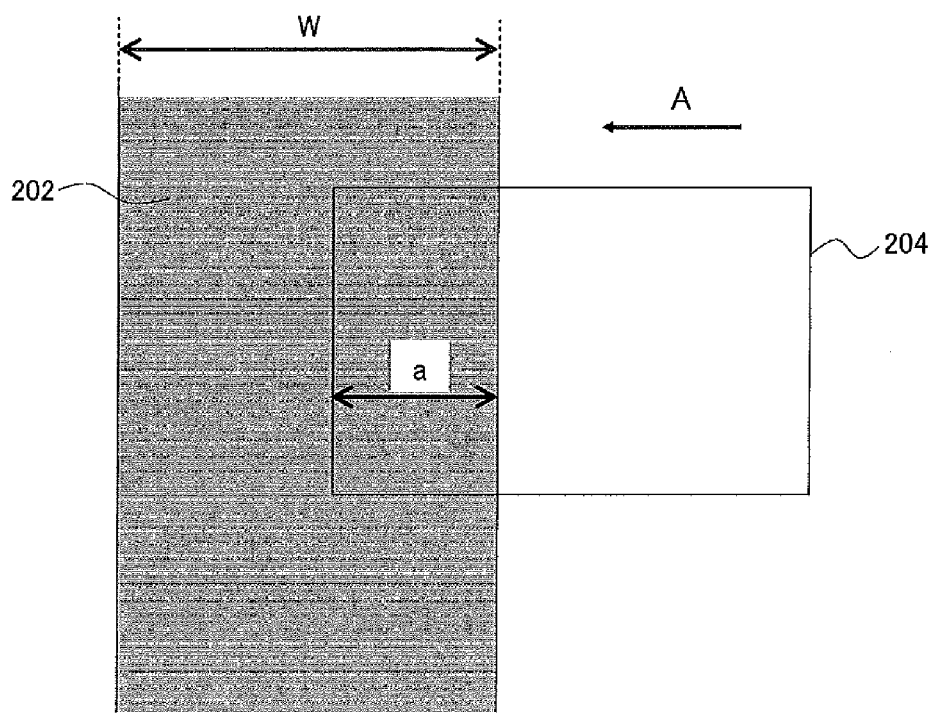
FIG. 8 shows a figure for explaining a rule for reducing the moving speed according to the embodiment when a display area enters a restriction area.

FIG. 8 shows a figure for explaining a rule for reducing the moving speed when the display area enters the restriction area defined as shown in FIG. 7. Referring to FIG. 8, it is assumed that a display area 204 is being moved by user control in the direction indicated by arrow A and that the display area 204 enters the restriction area 202 defined in the image. Given that the width of the restriction area 202 is W and the width of the display area 204 entering the restriction area 202 is "a", the moving speed Vf is computed as follows.

$$Vf = Vox(1.0 - a/W) \quad \text{(expression 1)}$$

where Vo denotes the original moving speed defined by the amount of user control of the input device 20.

In other words, when the display area 204 enters the restriction area 202 and is moved further into the restriction area 202, the moving speed is controlled to be lower as the extent of entry is increased. When the display area 204 reaches the display margin (e.g., an edge of the image), a=W so that the moving speed reaches 0. The same is true when the magnification scale of the displayed image enters the restriction area 202 defined for the magnification scale. In this case, the difference between Zla or Zsm, which defines the restriction area 202 of FIG. 7, and the magnification scale of the image being displayed is defined as "a" of expression 1.

When the user stops moving the display area while the display area 204 enters the restriction area 202 as shown in FIG. 8 by, for example, releasing the analog stick 27a, 27b manually tilted, the display area 204 is bounced in a direction opposite to the direction indicated by arrow A. The moving speed Vr in this case is computed as follows.

$$Vr = Vmax \times a/w \quad \text{(expression 2)}$$

where Vmax denotes the maximum moving speed permitted for image display.

In other words, the larger the extent that the display area 204 enters the restriction area 202, the greater the speed at which the display area 204 is bounced. In the case that the display area 204 reaches the display margin, a=W so that the display area 204 is bounced at the maximum speed. Vmax may be defined to a value smaller than the maximum moving speed as appropriate. When the display area 204 enters the restriction area 202 in a plurality of X-axis, Y-axis, and Z-axis directions of the virtual space, vector computation is performed so that computation of expression 1 and expression 2 is performed for each of vector elements.

Expressions 1 and 2 defines linearly determining the moving speed in response to the width "a" by which the display area 204 enters the restriction area 202. However, the embodiment is non-limiting and any function represented by a curve may be used. For example, the moving speed may be determined assuming that elastic collision occurs between the restriction area 202 and the display area 204.

Figure 9:
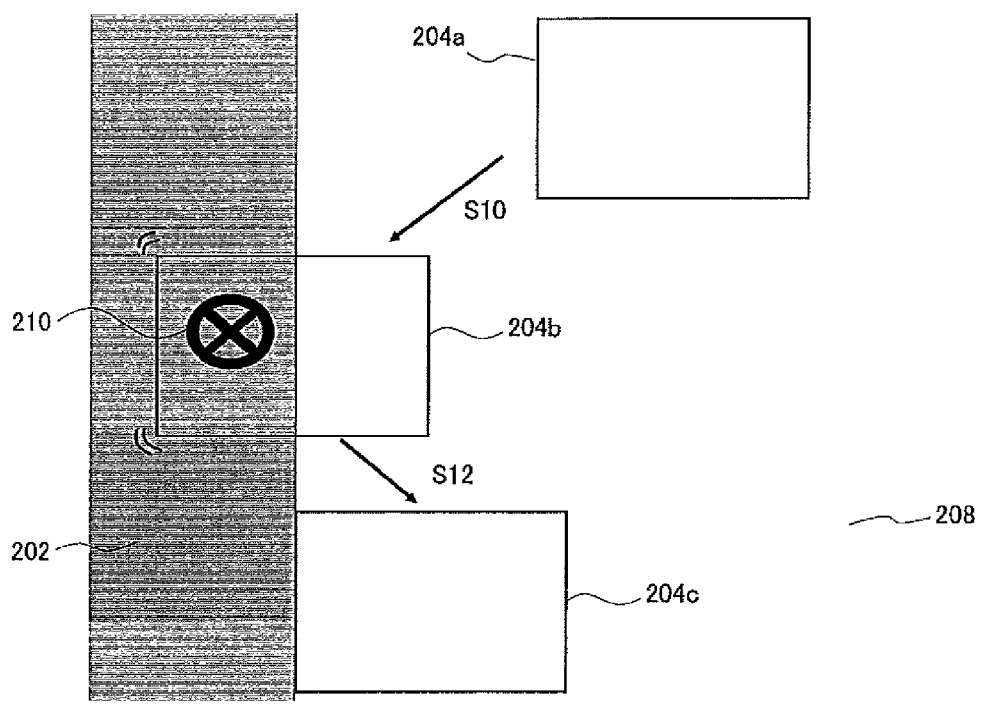
FIG. 9 schematically shows the movement of a display area relative to a restriction area according to the embodiment.

FIG. 9 schematically shows the movement of the display area 204 relative to the restriction area 202. Referring to FIG. 9, three display areas 204a, 204b, and 204c represent time-dependent change of the display area in the horizontal direction. The vertical direction in the figure represents elapse of time. An image area 208 outside the restriction area 202 is shaded differently, but this does not mean that image is colored accordingly. FIG. 9 shows the movement of a display area in an image plane. The movement of the display area in response to the magnification scale may be controlled similarly by interpreting the left side of the display area 204*a* as an image plane.

When the display area is located in the image area 208 outside the restriction area 202 (display area 204*a*), the display area 204 is moved at a speed corresponding to the amount of user control to request the movement using the input device 20. The display area 204 is moved toward the restriction area 202 at that speed (S10). When the display area enters the restriction area 202, the moving speed is reduced as indicated by expression 1. In the display area 204*b* at that time, a mark 210 indicating that the restriction area 202 is entered may be displayed, in addition to reducing the moving speed. In this case, the restriction area determination unit 120 requests the displayed image processing unit 114 to display the mark 210.

This allows the user to recognize that the display margin is approached using a means other than the moving speed. The mark 210 may be displayed on a larger scale as the width "a" by which the display area 204 enters the restriction area 202 is increased. Aside from the mark 210, an indicator indicating how deep the restriction area is entered or how close the display area 204 is to the display margin may be displayed. Still alternatively, the entirety of the display area or part thereof may be subjected to image process such as blur process. Similarly as above, it is ensured that the larger the width "a" by which the display area 204 enters the restriction area 202, the more the image is changed. Alternatively, a vibrator (not shown) may be built in the handle 28*a*, 28*b* of the input device 20 so that the vibrator is vibrated harder the larger the width "a" of entry. In this case, the restriction area determination unit 120 transmits a signal for vibrating the vibrator to the input device 20. In this way, the user is allowed to recognize more fully that the display margin is approached.

When the request for moving the display area is suspended as a result of, for example, the user releasing the analog stick 27*a* while the display area 204*b* is being displayed, the display area is bounced to the image area 208 outside the restriction area 202 at the moving speed given by expression 2 (S12). In this case, the display area may be prevented from moving further when the display area leaves the restriction area 202 so as to result in the display area 204*c*. Alternatively, the display area may be bounced to a predefined point distanced from the restriction area 202. A plurality of points may be defined so that a nearby point may be selected depending on the position of bouncing.

When the display area is bounced to a point distance from the restriction area, the display area may be moved at a speed Vr given by expression 2 within the restriction area and the speed is attenuated outside the restriction area until it reaches 0 at the predefined point. This creates natural motion in which the display area bounced off comes to a halt due to friction. When the image data is hierarchical data, it is desirable that the display area is bounced from the restriction area defined for the magnification scale such that the scale is prevented from being increased and remains in a range that does not require switching to a different layer to retrieve image data for decoding. This helps express the motion of bouncing in a way that more natural change in the image is presented.

It is ensured that the display area is bounced in S12 in a direction normal to the boundary of the restriction area 202 irrespective of the angle of incidence of the display area. This helps the user to recognize which direction the display margin lies in. Alternatively, the display area may be bounced in a direction opposite to the angle of incidence of the display area or bounced in a direction symmetrical to the incidence angle with respect to the normal of the boundary of the restriction area 202. The image data for the mark 210, the destination point of bouncing, and the direction of bouncing are determined depending on the content of the image and defined in the configuration file. The configuration related to the destination point of bouncing and the direction of bouncing are read by the bouncing speed determination unit 126 and reflected in the bouncing of the display area by communicating the direction as well as speed to the frame coordinate computation unit 124.

Figure 10:
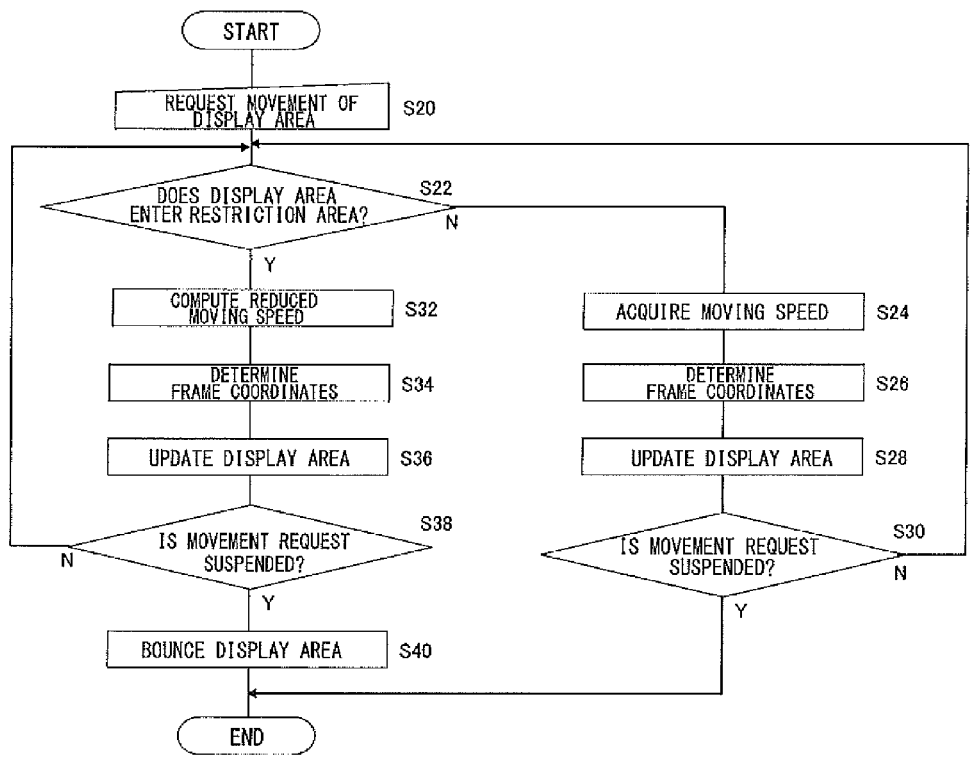
FIG. 10 shows a flow chart including the steps for the movement of a display area performed by the information processing device according to the embodiment.

A description will now be given of the operation implemented by the configuration as described above. FIG. 10 shows a flowchart including the steps for the movement of a display area performed by the information processing device 10. When the user provides a request for moving a display area using the input device 20 while a desired image is being displayed on the display device 12 (S20), the restriction area determination unit 120 determines whether the display area enters the restriction area (S22). The determination is continuously made while the display area is being moved. When the display area does not include the restriction area (N in S22), the moving speed determination unit 122 acquires the moving speed corresponding to the amount of control of the input device 20 such as the amount of tilting the analog stick 27*a*, 27*b*, as described above (S24).

Subsequently, the frame coordinate computation unit 124 computes the amount of move determined by the moving speed and computes the frame coordinates of a new display area by adding the amount of move to the frame coordinates of the display area currently displayed (S26). When the new display area is not stored in the buffer memory 70, the new display area is rendered and displayed on the display device 12 by communicating the frame coordinates to the decoding unit 106 and the displayed image processing unit 114. When the new display area is stored in the buffer memory 70, the associated frame coordinates are communicated to the image processing unit 114 (S28).

When the request for moving the display area by the user is not suspended, control is returned to the step of determining whether the new display area enters the restriction area (N in S30, S22). When the request for moving the display area is suspended before the restriction area is entered (Y in S30), the process of moving the display area is terminated.

Meanwhile, when it is determined that the display area enters the restriction area (Y in S22), the moving speed determination unit 122 uses expression (1) to compute the moving speed by subtracting the moving speed as determined by the amount of user control by the extent that the display area enters the restriction area (S32). Subsequently, the frame coordinate computation unit 124 computes the amount of movement of the frame as determined by the moving speed and computes the frame coordinates of the new display area by adding the amount of move to the frame coordinates of the display area being displayed (S34).

The new display area is displayed on the display device 12 as in S28, using the computed frame coordinates (S36). In this process, the displayed image processing unit 114 superimposes an image of a mark on the image of the display area or subjects the image of the display area to image process, depending on the configuration in the configuration file. When the request for moving the display area by the user is not suspended, control is returned to the step of determining whether the new display area enters the restriction area (N in S30, S22).

When the request for moving the display area is suspended while the display area enters the restriction area (Y in S38), the bouncing speed determination unit 126 computes the bouncing speed in accordance with the extent that the display area enters the restriction area at that point of time. Further, the direction of bouncing and the destination point of the bouncing configured in the configuration file are retrieved so that the display area is displayed as being bounced off through the cooperation with the frame coordinate computation unit 124, the decoding unit 106, and the displayed image processing unit 114 (S40), whereupon the process of moving the display area is terminated.

According to the embodiment described above, the information processing device adapted to move a display area through user control is configured to define a range of a predetermined width close to a display margin (e.g., an edge of an image to be displayed) as a restriction area. When the display area is moved to enter the restriction area, the display area is moved at a speed smaller than the original moving speed as determined by the amount of user control. In this process, the moving speed is reduced as the width by which the display area enters the restriction area is increased and the movement is suspended when the display area reaches the display margin.

A similar restriction area is defined in the direction of increasing or decreasing the magnification scale. The moving speed is reduced in accordance with the width by which the magnification scale of the image being displayed enters the restriction area in the direction of increasing or decreasing the magnification scale so that enlargement or reduction is suspended at the limit of the magnification scale. This makes the user feel as if the display area enters a cushion or mud before the display area reaches the display margin and intuitively recognize that the display margin is being approached. As a result, the user is prevented from feeling abrupt or uncomfortable as a result of sudden stop of the display area.

When the user suspends the movement of the display area while the display area enters the restriction area, the display area is bounced off to leave the restriction area. This gives the user guidance on which direction to move and reduces the frequency of wandering in an area such as an image edge with relatively small amount of information or entering the restriction area again, allowing the user to return to a desired area efficiently. By defining the destination of bouncing at a location where the user can easily know the current position, the user can move the display area to a desired location more efficiently. Alternatively, the display area may be configured to be bounced to a location where the content creator wishes the user to pay attention to.

Apart from reducing the moving speed, awareness of the user is further promoted by displaying a mark or an indicator indicating that the display margin is approached or by vibrating the input device. The restriction area may be defined in desired areas other than a display margin such as an edge of an image. For example, the restriction area may be defined in an area where no information is displayed or an area that a content creator would not like to display. As in the case of a display margin, this will allow the user to recognize such an area in advance and will avoid the display of such a location in natural motion.

Given above is an explanation of the present invention based on an embodiment. The embodiment is intended to be illustrative only and it will be obvious to those skilled in the art that various modifications to constituting elements and processes could be developed and that such modifications are also within the scope of the present invention.

A description is given above of an embodiment where the display area is bounced off to leave the restriction area at a speed Vr given by expression 2 in the event that the user suspends moving the display area while the display area enters the restriction area. In one alternative, a bouncing force may always be exerted from the restriction area while the display area enters the restriction area irrespective of whether the movement of the display area is suspended. For example, the speed and direction of the movement of the display area may be determined by vector synthesis of the force determined by the amount of user control exerted inward the restriction area and the bouncing force.

The magnitude of the bouncing force may vary depending on the width by which the display area enters the restriction area as given by expression 2. In this case, by defining the bouncing force so that the force corresponding to the maximum amount of control permitted in the input device is equal to the bouncing force at the display margin, it is ensured that the movement of the display area is suspended or the display area is bounced off before the display margin is reached, irrespective of the amount of user control. This variation also helps control the speed of movement of the display area in the restriction area and cause the display area to be bounced off, thereby achieving the same advantage as provided by the embodiment.

DESCRIPTION OF THE REFERENCE NUMERALS

1 information processing system, 10 information processing device, 12 display device, 20 input device, 30 0-th layer, 32 first layer, 34 second layer, 36 third layer, 38 tile image, 44 display processing unit, 50 hard disk drive, 60 main memory, 70 buffer memory, 100 control unit, 102 input information acquisition unit, 103 loading unit, 104 display area determination unit, 106 decoding unit, 114 displayed image processing unit, 120 restriction area determination unit, 122 moving speed determination unit, 124 frame coordinate computing unit, 126 bouncing speed determination unit, 202 restriction area, 204 display area As described above, the present invention is applicable to an information processing device such as a computer, game device, image display device.

The invention claimed is:

1. An information processing device comprising:
an input information acquisition unit configured to receive a request for changing a display area displayed on a display device within a target image to be displayed, by at least moving on the target image plane, enlarging, or reducing the display area, the request being received via an input device controlled by a user; and
a displayed image processing unit configured to change the display area and render the image accordingly, in accordance with the request for changing the display area,
wherein the displayed image processing unit changes the display area at a speed smaller than the speed of change included in the user inputted request from the input device when the display area enters a restriction area and while the request for changing the display area remains in effect,
wherein the moving speed of the display area is reduced when entering the restriction area according to the following formula: $Vf = Vo \times (1.0 - a/W)$, wherein $Vf$ is the final moving speed, $Vo$ is the original moving speed defined by the amount of user control of the input device, W is the width of the restricted area, and a is width of the display area entering the restricted area.

2. The information processing device according to claim 1, wherein the displayed image processing unit reduces the speed of change of the display area according to the amount by which the display area goes beyond a boundary of the restriction area.

3. The information processing device according to claim 1, wherein, when the request for changing the display area is suspended while the display area enters the restriction area, the displayed image processing unit changes the display area so as to be outside the restriction area.

4. The information processing device according to claim 3, wherein the displayed image processing unit ensures that the larger the amount by which the display area goes beyond a boundary of the restriction area, the larger the speed of change of the display area, so as to be outside the predefined specified area or outside the magnification scale range.

5. The information processing device according to claim 3, wherein, when the request for changing the display area is suspended while the display area enters the restriction area, the displayed image processing unit changes the display area so as to be a restriction area.

6. The information processing device according to claim 1, wherein, when the display area enters the restriction area while the request for changing the display area remains in effect, the displayed image processing unit adds an image indicating entry into said restriction area and renders the display area accordingly.

7. The information processing device according to claim 1, further comprising a vibration control unit configured to notify the user accordingly, when the display area enters the restriction area while the request for changing the display area remains in effect, by using vibration through a vibration unit built in the input device.

8. The information processing device according to claim 1, wherein the displayed image processing unit invalidates the restriction area on the target image plane when the magnification scale of the image is less than a predefined threshold value.

9. The information processing device according to claim 1, wherein the displayed image processing unit defines the restriction area on the target image plane having a width dependent on the size of the target image at an edge of the target image if the restriction area on the target image plane is not defined for the target image to be displayed.

10. The information processing device according to claim 1, wherein when the request for moving the display area is suspended while the display area enters the restriction area, the display area is moved outside the restriction area in a bouncing action.

11. The information processing device according to claim 1, wherein the bounce speed is directly related to the extent to which the display area enters the restriction area.

12. The information processing device according to claim 1,
wherein the image has a hierarchical structure comprising a plurality of layers, each having one or more image tiles, such that each layer in the direction of depth defined along the z-axis has a different resolution,
wherein horizontal movement in a layer is defined along the x-axis and vertical movement in a layer is defined along the y-axis,
wherein a three-dimensional virtual space is formed by the hierarchical structure defined by the x, y, and z-axis.

13. An information processing method comprising:
receiving a user inputted request from an input device for changing a display area displayed on a display device within a target image to be displayed, by at least moving on the target image plane, enlarging, or reducing the display area, the request being received via an input device controlled by a user; and
changing the display area at a speed smaller than the speed of change included in the user inputted request when the display area enters a restriction area and while the request for changing the display area remains in effect, and displaying the display area on the display device accordingly,
wherein the moving speed of the display area is reduced when entering the restriction area according to the following formula: $Vf=Vo \times (1.0-a/W)$, wherein $Vf$ is the final moving speed, $Vo$ is the original moving speed defined by the amount of user control of the input device, W is the width of the restricted area, and a is width of the display area entering the restricted area.

14. The information processing method according to claim 13, further comprising: changing, when the request for changing the display area is suspended while the display area enters the restriction area, the display area so as to be outside the restriction area.

15. A computer program embedded in a non-transitory, computer-readable recording medium, comprising:
a module configured to receive a user inputted request from an input device for changing a display area displayed on a display device within a target image to be displayed, by at least moving on the target image plane, enlarging, or reducing the display area, the request being received via an input device controlled by a user; and
a module configured to change the display area at the speed smaller than a speed of change included in the user inputted request when the display area enters a restriction area and while the request for changing the display area remains in effect, and to display the display area on the display device accordingly,
wherein the moving speed of the display area is reduced when entering the restriction area according to the following formula: $Vf=Vo \times (1.0-a/W)$, wherein $Vf$ is the final moving speed, $Vo$ is the original moving speed defined by the amount of user control of the input device, W is the width of the restricted area, and a is width of the display area entering the restricted area.

16. The computer program embedded according to claim 15, further comprising: a module configured to change, when the request for changing the display area is suspended while the display area enters the restriction area, the display area so as to be outside the restriction area.

17. The computer-readable recording medium according to claim 15, wherein the computer program further comprises: a module configured to change, when the request for changing the display area is suspended while the display area enters the restriction area, the display area so as to be outside the restriction area.

18. A non-transitory computer-readable recording medium having embodied thereon a computer program comprising:
a module configured to receive a user inputted request from an input device for changing a display area displayed on a display device within a target image to be displayed, by at least moving on the target image plane, enlarging, or reducing the display area, the request being received via an input device controlled by a user; and
a module configured to change the display area at a speed smaller than the speed of change included in the user inputted request when the display area enters a restriction area and while the request for changing the display area remains in effect, and to display the display area on the display device accordingly, wherein the moving speed of the display area is reduced when entering the restriction area according to the following formula: $Vf=Vo\times(1.0-a/W)$, wherein $Vf$ is the final moving speed, $Vo$ is the original moving speed defined by the amount of user control of the input device, $W$ is the width of the restricted area, and $a$ is width of the display area entering the restricted area.

19. A non-transitory, computer readable recording medium containing a data structure for image display configured to map data for an image to a configuration file configured to define at least one restriction area, where a display area displayed on a display device within the image is changed at a speed smaller than a speed of change included in a user inputted request, while the user is inputting the request for changing the display area, wherein the moving speed of the display area is reduced when entering the restriction area according to the following formula: $Vf=Vo\times(1.0-a/W)$, wherein $Vf$ is the final moving speed, $Vo$ is the original moving speed defined by the amount of user control of the input device, $W$ is the width of the restricted area, and $a$ is width of the display area entering the restricted area, wherein the image has a hierarchical structure comprising a plurality of layers, each having one or more image tiles, such that each layer in the direction of depth defined along the z-axis has a different resolution.

* * * * *